Oct. 26, 1954     L. SCHWARZMAYR     2,692,742
AIRCRAFT HAVING DRAG REDUCING MEANS
Filed July 28, 1953
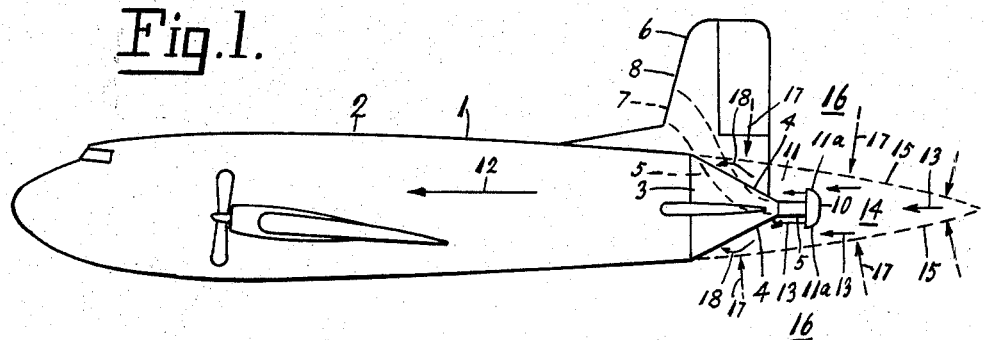
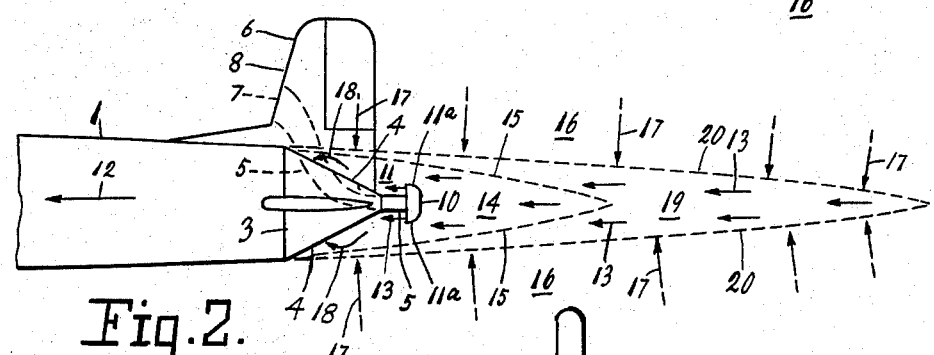
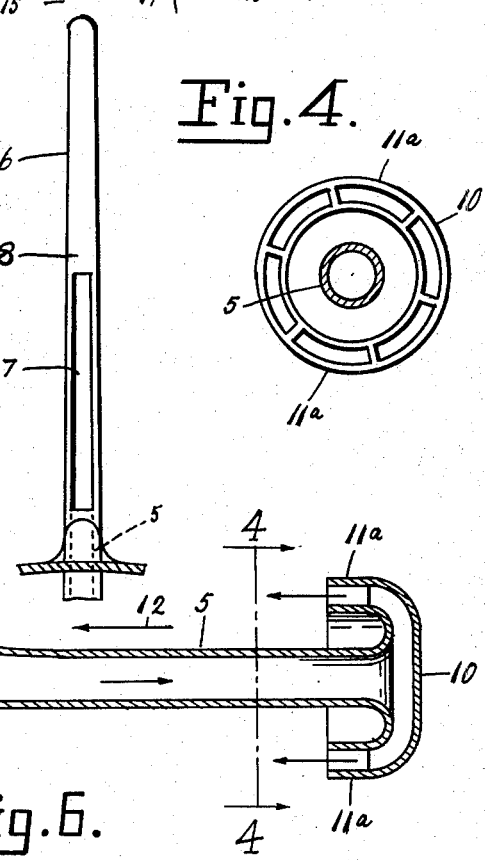
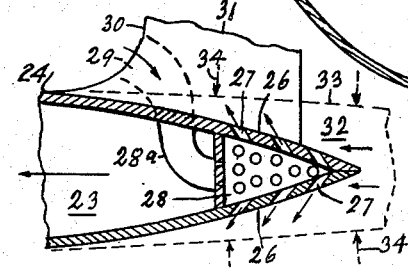

Patented Oct. 26, 1954

2,692,742

UNITED STATES PATENT OFFICE 2,692,742

AIRCRAFT HAVING DRAG REDUCING MEANS

Ludwig Schwarzmayr, San Francisco, Calif.

Application July 28, 1953, Serial No. 370,743

4 Claims. (Cl. 244—130)

My invention relates to improvements in aircraft constructions.

One object of my invention is to prevent formation of a low pressure zone in the trailing zone of the fuselage.

Another object is to make possible reduction of weight of the fuselage by providing the fuselage with an antidrag air supplier maintaining a streamlined body of air behind the fuselage, thereby making a long streamlined rear portion of the fuselage unnecessary.

I attain these objects by the constructions illustrated in the accompanying drawings, in which—

Figure 1 is a side elevation of the aircraft embodying my invention;

Figure 2 is the rear part of the fuselage shown in Fig. 1, and illustrating the drag preventing bodies of air formed under different speeds and different altitudes of travel;

Fig. 3 is a detailed vertical section of the antidrag air supplier shown in Figs. 1 and 2.

Fig. 4 is a view on line 4—4 in Fig. 3;

Fig. 5 is a front elevation of the fin shown in Figs. 1 and 2; and

Fig. 6 is a vertical section of the antidrag air supplier in a modified form and in conjunction with the trailing end section of a conventional fuselage.

The fuselage 1 of the aircraft 2 has not the conventional streamlined trailing section but has a trailing end 3 of abruptly converging sides 4—4. An air guide 5 in the trailing end 3 of the fuselage extends into the fin 6, and its air receiving end 7 is in the leading edge 8 of the fin. The air guide 5 extends rearwards from the trailing end 3 of the fuselage, and has an air supplier 10 at the end which delivers air to the trailing zone 11 of the fuselage 1. The air supplier 10 has flow directing guides 11ª—11ª arranged to direct a flow of air towards the trailing end 3 of the fuselage and in the direction of flight 12. The forwardly projected air, illustrated by the arrows 13—13, maintains the forwardly moving body of air 14, the outline of which is illustrated by the broken lines 15—15, which also indicate the outline of the stationary mass of air 16—16, which is moved against the body of air 14 by atmospheric pressure, illustrated by the arrows 17—17. The air that is projected forwardly towards the sides 4 by the supplier 10 is turned by them towards the stationary mass of air 16, which is under atmospheric pressure 17, and the mass of air 16 under atmospheric pressure 17 resists, and turns the air back towards the sides 4, as is illustrated by the arrows 18—18. Therefore adjacent to the sides 4, a pressure higher than the atmospheric pressure is developed. Fig. 2 is the rear part of the fuselage shown in Fig. 1, and is of the same construction, and shows the same outline of the forwards moving body of air 14, shown in broken lines 15—15. The relatively short trailing body of air 14 is formed when the aircraft flies at a low rate of speed or at a low altitude, but when the aircraft flies at a high rate of speed or at a high altitude, the body of air 19 expands rearwards, as is illustrated by the broken lines 20—20. As the bodies of air 14 and 19 are constantly supplied with new air by the air supplier 10, they expand rearwards when the speed of the aircraft is increased or when flying at a high altitude, and so, the bodies of air 14 and 19 are constantly in contact with the stationary mass of air 16 and under atmospheric pressure 17. The frictional contact, between the stationary mass of air 16 and the moving bodies of air 14 and 19, causes the outer film of air of these bodies of air to be dragged rearwards and be left behind, but this loss of air is replenished by air delivered by the air supplier 10.

Fig. 6 is a modified form of the antidrag device in conjunction with the trailing end 23 of a conventional fuselage 24 of an aircraft. The sides 26—26 of the trailing end 23 have forwardly directed flow guides 27—27. The chamber 28 connects the flow guides 27 with the air guide 28ª, which has an air receiving end 29 in the leading edge 30 of the fin 31. The flow guides 27 deliver air to the trailing zone 32 of the trailing end 23, thereby, in the trailing zone 32 is maintained the body of air 33, which is under atmospheric pressure 34—34.

I claim:

1. In an aircraft fuselage, a trailing end, antidrag means comprising an air guide having an air receiving end and an air delivery end, said air receiving end disposed to receive air during flight, and said air delivery end having guide members disposed to deliver a flow of air to the trailing zone of said trailing end in a forwardly direction.

2. In an aircraft fuselage, a trailing end, antidrag means comprising an air guide having an air receiving end and an air delivery end, said air receiving end disposed to receive air during flight, and said air delivery end having guide members disposed to deliver a flow of air to the trailing zone of said trailing end in a forwardly direction against said trailing end.

3. In an aircraft fuselage, a trailing end, anti-drag means comprising an air guide having an air receiving end and an air delivery end, said air receiving end disposed to receive air during flight, said air delivery end having guide members disposed to deliver a flow of air to the trailing zone of said trailing end in a forwardly direction against said trailing end, and said trailing end having relatively abruptly converging sides.

4. In an aircraft fuselage, a trailing end, anti-drag means comprising an air guide having an air receiving end and an air delivery end, said air receiving end disposed to receive air during flight, said air delivery end disposed to deliver a flow of air to the trailing zone of said trailing end in a forwardly direction, and said air delivery end arranged in the side of said trailing end.

References Cited in the file of this patent

UNITED STATES PATENTS

| Number | Name | Date |
| --- | --- | --- |
| 2,037,942 | Stalker | Apr. 21, 1936 |
| 2,041,792 | Stalker | May 26, 1936 |
| 2,428,737 | Crook et al. | Oct. 7, 1947 |
| 2,568,813 | Lundberg | Sept. 25, 1951 |
| 2,650,781 | Taylor | Sept. 1, 1953 |